United States Patent [19]

Goe et al.

[11] Patent Number: 5,593,707

[45] Date of Patent: Jan. 14, 1997

[54] AUGER CONVEYOR ASSEMBLY FOR HEATING AND FEEDING POLYMER COATED POWDER TO THE SHUTTLE OF A COMPACTING PRESS

[75] Inventors: Bryan W. Goe, Dry Ridge, Ky.; Robert C. Hertlein, Evendale, Ohio

[73] Assignee: Cincinnati Incorporated, Cincinnati, Ohio

[21] Appl. No.: 412,076

[22] Filed: Mar. 28, 1995

[51] Int. Cl.[6] .................................................. B29C 47/84
[52] U.S. Cl. .................... 425/257; 264/211.23; 264/349; 366/186; 425/258; 425/378.1; 425/447
[58] Field of Search ........................... 425/378.1, 200, 425/208, 256, 257, 258, 447, 448, 168, 143; 366/186, 318; 264/211.21, 211.23, 235, 349

[56] References Cited

U.S. PATENT DOCUMENTS

| | | | |
|---|---|---|---|
| 2,688,770 | 9/1954 | Henning | 425/378.1 |
| 2,839,786 | 6/1958 | Alesi | 425/258 |
| 3,522,627 | 8/1970 | Vanzo | 425/378.1 |
| 3,832,107 | 8/1974 | Cox et al. | 425/258 |
| 3,870,451 | 3/1975 | Gocken | 425/378.1 |
| 3,988,099 | 10/1976 | King et al. | 425/258 |
| 4,327,996 | 5/1982 | Affolder | 425/258 |
| 4,355,905 | 10/1982 | St. Louis et al. | 425/378.1 |
| 4,734,240 | 3/1989 | Chung et al. | 425/378.1 |
| 4,887,907 | 12/1989 | Hahn et al. | 425/378.1 |
| 4,913,641 | 4/1990 | Zahradnik | 425/378.1 |
| 5,213,816 | 5/1993 | Smyth, Jr. et al. | 425/78 |
| 5,366,680 | 11/1994 | Foresman | 425/378.1 |

FOREIGN PATENT DOCUMENTS 1-317736  12/1989  Japan ................................. 425/378.1

Primary Examiner—Jay H. Woo
Assistant Examiner—Duane S. Smith
Attorney, Agent, or Firm—Frost & Jacobs

[57] ABSTRACT

An auger conveyor assembly for heating and feeding polymer coated powder from a powder supply assembly to a shuttle assembly for ultimate delivery to the die cavity of a compacting press. The auger conveyor has an auger tube having near its rearward end an inlet connected to the powder supply assembly and near its forward end an outlet for delivery of heated polymer coated powder to the shuttle assembly. A hollow tubular auger with flights on its exterior surface is rotatably mounted in the auger tube and is rotatable therein by a motor and gear assembly to advance the polymer coated powder. For the majority of its length the auger tube is surrounded by ceramic band heaters. An air heater is mounted on a manifold at the driven end of the auger. An air tube connected to the manifold extends through the length of the auger. The tube has perforations at the discharge end of the auger. Compressed air is heated and blown through the air tube and passes through the air tube perforations, returning to the manifold via the annular space between the air tube and the auger and exiting the manifold through a muffler to atmosphere. Heating the annular column of polymer coated powder from both the inside and outside, together with the mixing action of the auger provides better and more controlled heating of the polymer coated powder and increases throughput of the auger conveyor assembly.

10 Claims, 5 Drawing Sheets

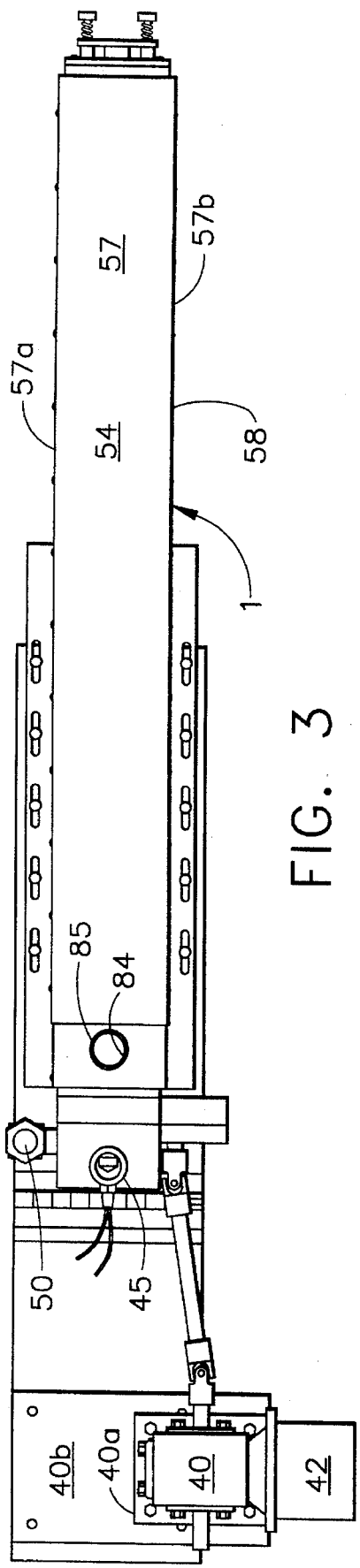
FIG. 3
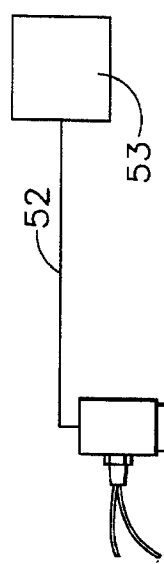
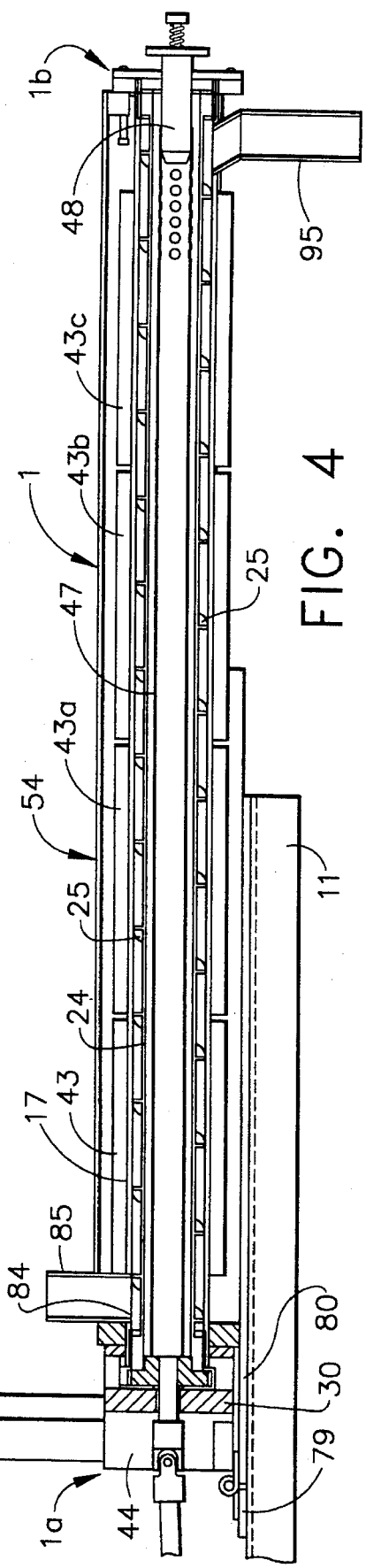
FIG. 4

AUGER CONVEYOR ASSEMBLY FOR HEATING AND FEEDING POLYMER COATED POWDER TO THE SHUTTLE OF A COMPACTING PRESS

TECHNICAL FIELD

The invention relates to an auger conveyor assembly for heating and feeding polymer coated powder from a source thereof to the shuttle of a conventional compacting press, and more particularly to such an auger conveyor assembly in which the polymer coated powder is heated more rapidly and more thoroughly to increase throughput thereof.

BACKGROUND ART

There is presently a great deal of interest in the use of a compacting press to manufacture parts from iron powders and other powders (such as nonferrous powders, ceramic powders, and the like) where each particle of powder is coated with a very thin layer of polymer. If these powders are compacted at temperatures ranging from about 450° F. to about 550° F., the polymer materials "set" and the compacted parts have sufficient strength to eliminate the need for sintering after the compacting operation, although sintering can be practiced if desired.

In conventional compacting operations utilizing uncoated iron powder or the like, the powder is directed from a storage hopper by means of a flexible hose to the hopper of a delivery shuttle by which the powder is shifted to a die cavity in a measured amount. Difficulties are encountered, however, when attempting to use the same sort of delivery system for polymer coated powder wherein the powder is delivered to a heated die and held for a time sufficient to heat the powder to its desired temperature before the compacting operation. First of all, this approach is very time consuming. In addition, it causes localized over-heating where the powder is in contact with the heated die. The polymer coating acts as a temperature insulator, and those coated particles at the interior of the mass are slow to heat, while the polymer-coated particles adjacent the heated die "set" before the interior particles are hot enough to compact. Attempts have also been made to heat the polymer coated powder by external means to a temperature just below the "set" temperature prior to loading the polymer coated powder into the die cavity. It is characteristic of the polymer coated powder that it starts to coagulate and become "tacky" at a temperature of about 350° F. Since the usual production compacting method requires accurate gravity-controlled filling of the powder into the die cavity from a delivery shuttle, any coagulation or tackiness of the coated powder causes variations in the amount of powder that actually is deposited in the die cavity.

U.S. Pat. No. 5,213,816 teaches a delivery system which overcomes a number of these problems. The delivery system heats each polymer coated particle to a temperature just below the coagulation point. The heated powders are accurately fed to a heated die cavity on a conventional compacting press. The remaining increase in temperature to the "set" point is then rapidly achieved during a standard compacting cycle by a combination of the heated tooling and the energy imparted during the actual compacting stroke.

The teachings of the above-noted U.S. Pat. No. 5,213,816 are incorporated herein by reference. Briefly, this patent teaches the use of at least one auger assembly and at least one shuttle assembly. The at least one auger assembly comprises a vertical inlet pipe and a horizontally oriented auger conveyor. The auger conveyor has an entry port and a discharge end. The vertical inlet pipe has an upper end releasably connected to a source of polymer coated powder. The vertical inlet pipe has a lower end connected to the entry port of the horizontal auger. The vertical inlet pipe has a heating element wrapped about its periphery. The auger conveyor has a first heating element wrapped around its periphery and extending from its entry port toward its discharge end and a second heating element extending from the first heating element to the auger conveyor discharge end. The vertical inlet pipe heater imparts heat to the polymer coated powder. The auger conveyor heaters impart additional heat to the individual powder particles through a mixing action. The heated particles from the auger conveyor are discharged into the heated hopper of the shuttle. The shuttle has a heated powder ring which receives a measured amount of heated powder from the shuttle hopper. This measured amount of powder is discharged from the shuttle mechanism into the heated cavity of the compacting press. Thus, the heaters of the vertical tube, the auger conveyor, the shuttle hopper and the shuttle powder ring heat the individual particles of the polymer coated powder to a temperature just below the coagulation point thereof. As indicated above, the "set" point temperature is rapidly achieved during the compacting cycle by a combination of the heated tooling and the energy imparted during the actual compacting stroke.

While the system set forth in U.S. Pat. No. 5,213,816 works well, it would be advantageous to have an even greater throughput of heated polymer coated particles from the auger conveyor. The present invention is based upon the discovery that a greater throughput of the conveyor and more thorough heating of the individual polymer coated particles with greater control can be achieved if, in addition to the external heating elements about the conveyor, the auger is also heated internally. This is accomplished through the use of heated compressed air. When the auger is stopped, compressed air, unheated or heated to a lesser degree, can be used to cool the auger and the polymer coated powder within the auger, to keep the polymer coated powder from melting.

DISCLOSURE OF THE INVENTION

According to the invention there is provided an auger conveyor system for heating and feeding polymer coated powder from a powder supply assembly to a shuttle assembly for ultimate delivery to the cavity of a compacting press.

The auger conveyor comprises an elongated auger tube having a forward end and rearward end. Near its rearward end the auger tube has an inlet connected to the powder supply assembly. Near its forward end the auger tube has an outlet for delivery of heated polymer coated powder to the shuttle assembly. Within the auger tube there is a hollow tubular auger with flights on its exterior surface. The auger is rotatably mounted in the auger tube and is provided at its rearward end with a drive gear. The drive gear is meshed with a pinion gear which is operatively connected to and driven by an electric motor.

For the majority of its length the auger robe is surrounded exteriorly by ceramic band heaters. At the rearward end of the auger assembly there is a manifold having an inlet to which an air heater is attached. An elongated air robe of lesser diameter than the auger extends within and throughout the length of the auger with clearance. The forward end of the air robe is closed and adjacent its forward end the air robe is provided with a plurality of perforations communicating between the interior of the air robe and the annular space between the auger and the air robe. At its rearward end, this annular space is connected by the manifold to an exhaust muffler which leads to atmosphere. Compressed air is caused to pass through the air heater and the elongated air robe. At the forward end of the air robe the heated air passes from the air robe to the annular space between the air robe and auger. Thereafter, the heated air travels the length of the inside surface of the auger to atmosphere via the manifold and the exhaust muffler.

The combination of the ceramic band heaters about the auger robe and the hot air within the auger itself, results in the heating of a thin section of the polymer coated powder from the inside and from the outside. This, in combination with the mixing action of the auger, provides uniformly heated powder at the shuttle assembly with better temperature control and with greatly increased throughput. Thermocouples provide feedback to the various heaters. When the auger is stopped, compressed air (unheated or heated to a lesser degree) passing through the air robe and auger will tend to cool the auger and the polymer coated powder, keeping the polymer coated powder from melting.

Finally, the structure is provided to accommodate differential expansion of the various parts of the heating and feeding system, as will be set forth fully hereinafter.

BRIEF DESCRIPTION OF THE DRAWINGS

FIG. 3 is a top plan view of one of the auger conveyors of FIG. 1.

FIG. 4 is a side elevational view of the auger conveyor of FIG. 3, partly in cross-section.

DETAILED DESCRIPTION OF THE INVENTION

Figure 1:
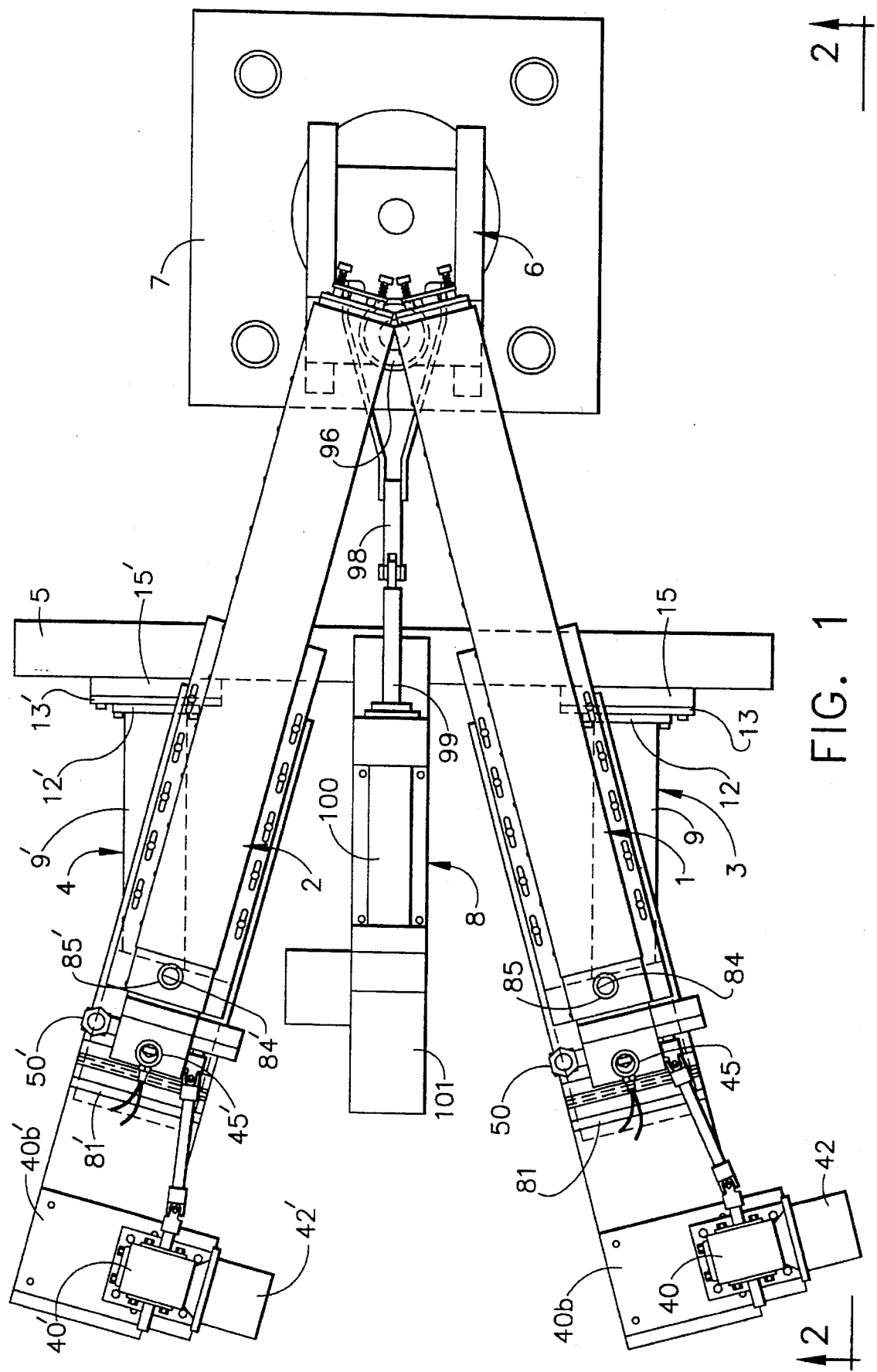
FIG. 1 is a simplified plan view of the feed system of the present invention.

Reference is first made to FIG. 1 which is a simplified plan view of the polymer coated powder feed system of the present invention. The feed system comprises a pair of substantially identical auger assemblies generally indicated at 1 and 2, respectively. The auger assemblies 1 and 2 are mounted on support assemblies generally indicated at 3 and 4, respectively. The support assemblies 3 and 4 are adjustably mounted on a tubular steel bracket 5. The bracket 5, in turn, is affixed to the frame (not shown) of a conventional compacting press. The feed system of the present invention also includes a shuttle assembly generally indicated at 6, and mounted on the die supporting assembly 7 of the compacting press. The movable portion of the shuttle assembly 6 is shiftable longitudinally between a retracted position and an extended position by a shuttle actuating assembly generally indicated at 8. The shuttle actuating assembly 8, in turn, is supported on the bracket 5.

Since the auger assemblies 1 and 2 are substantially identical, a description of auger assembly 1 can also serve as a description of auger assembly 2.

Figure 2:
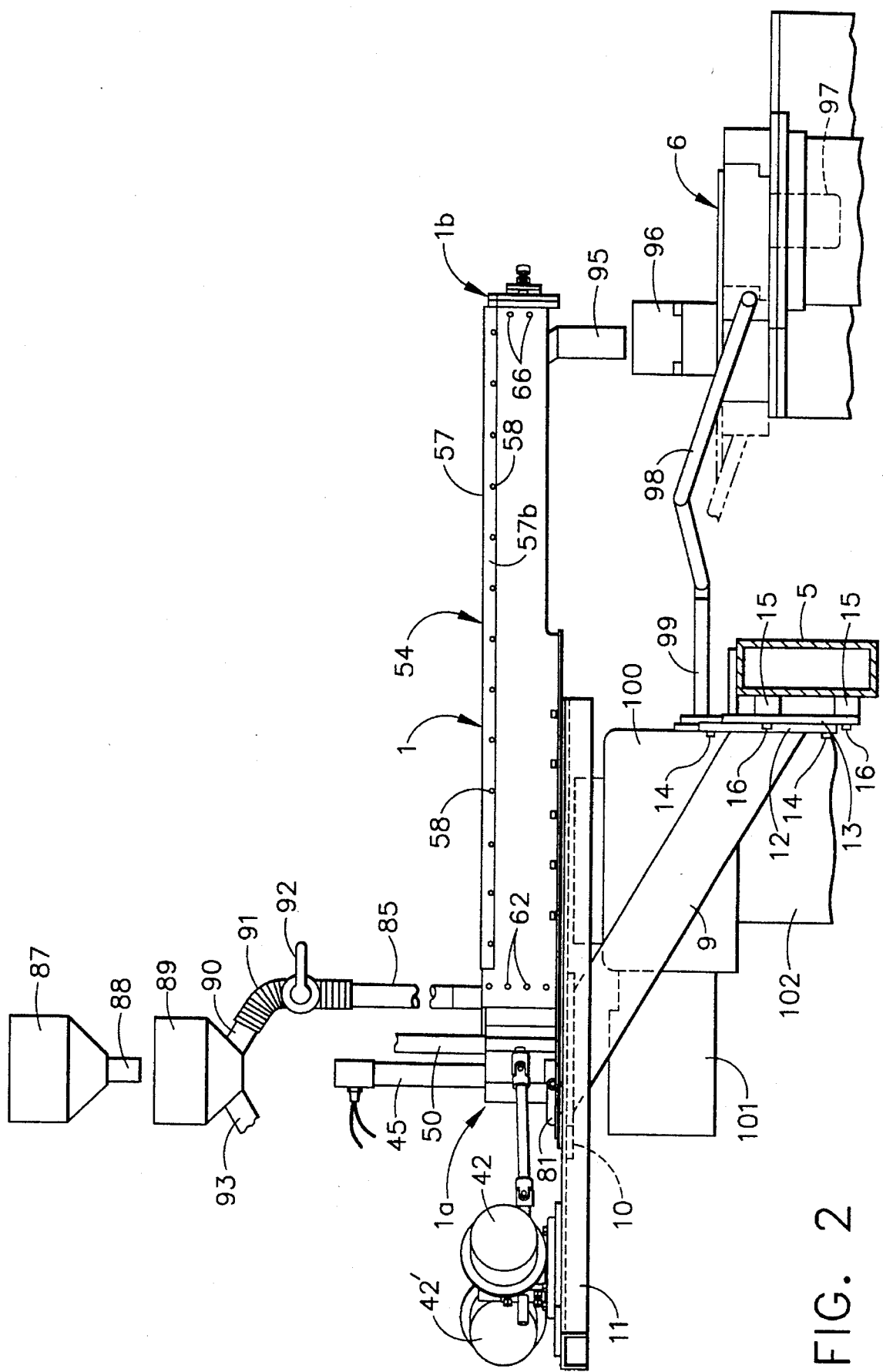
FIG. 2 is a fragmentary side elevational view of the structure of FIG. 1 as viewed from line 2—2 of FIG. 1.

Reference is first made to FIG. 2 wherein auger assembly 1 is shown as viewed from line 2—2 of FIG. 1. The support assembly 3 for the auger assembly 1 comprises an elongated upwardly and rearwardly extending arm 9. The upper end of arm 9 terminates in a horizontal end plate 10. Affixed to the horizontal end plate 10 there is an elongated channel member 11 which constitutes the main base for the overall auger assembly 1.

The lower end of arm 9 terminates in a vertical mounting plate 12. Vertical mounting plate 12, in turn, is attached to an adjustable mounting plate 13 by cap screws, two of which are shown at 14. The vertical edges of the adjustable mounting plate 13 are provided with a plurality of perforations, appropriately selected ones of which enable the adjustable mounting plate 13 to be affixed to horizontal spacers 15 by cap screws 16. The spacers 15 are appropriately attached to tubular steel bracket 5. This arrangement enables a vertical adjustment of auger assembly 1 with respect to the shuttle assembly 6.

Figure 5:
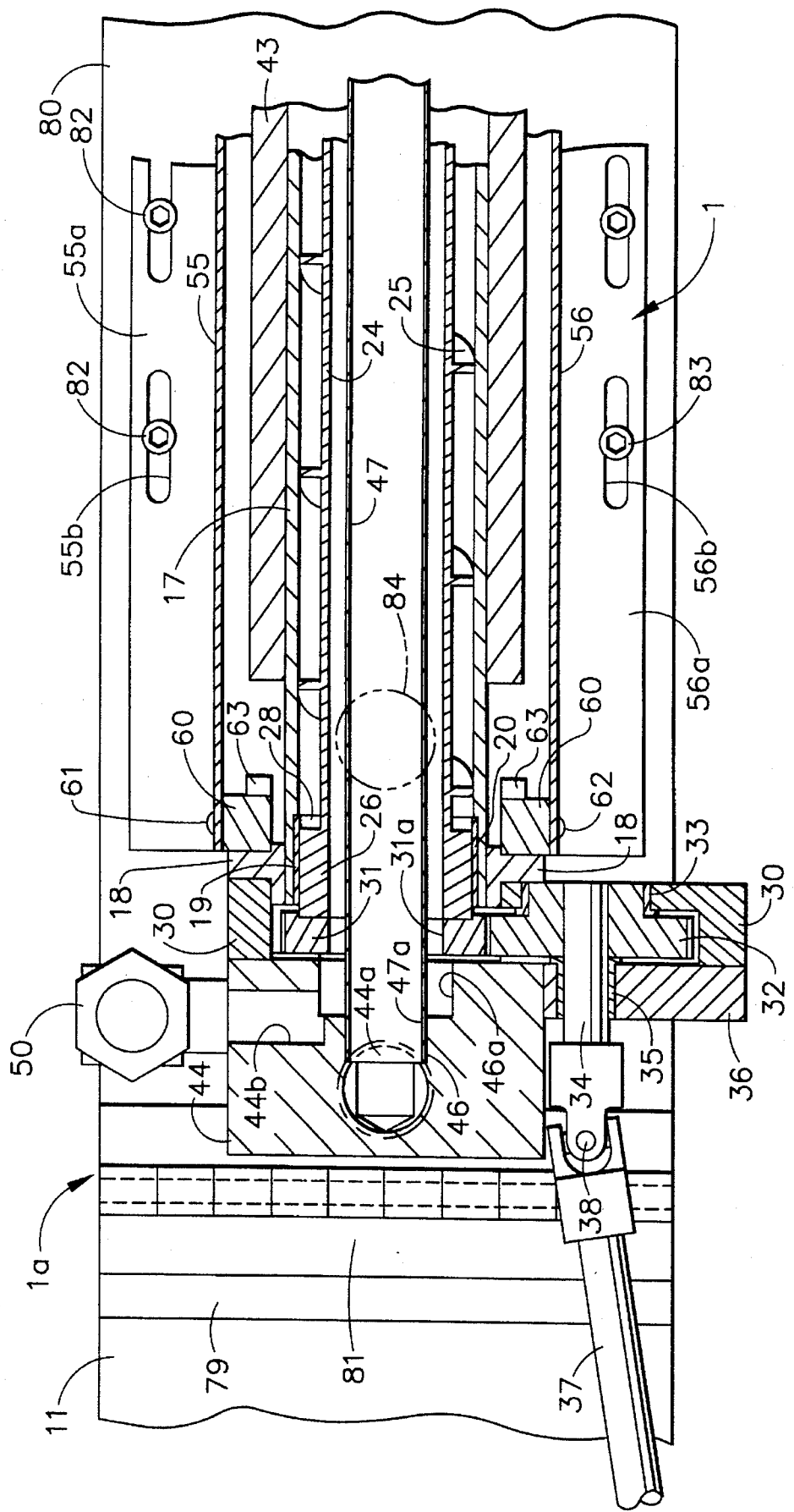
FIG. 5 is a fragmentary plan view, partly in cross-section of the rearward end of the auger conveyor of FIGS. 3 and 4.
Figure 6:
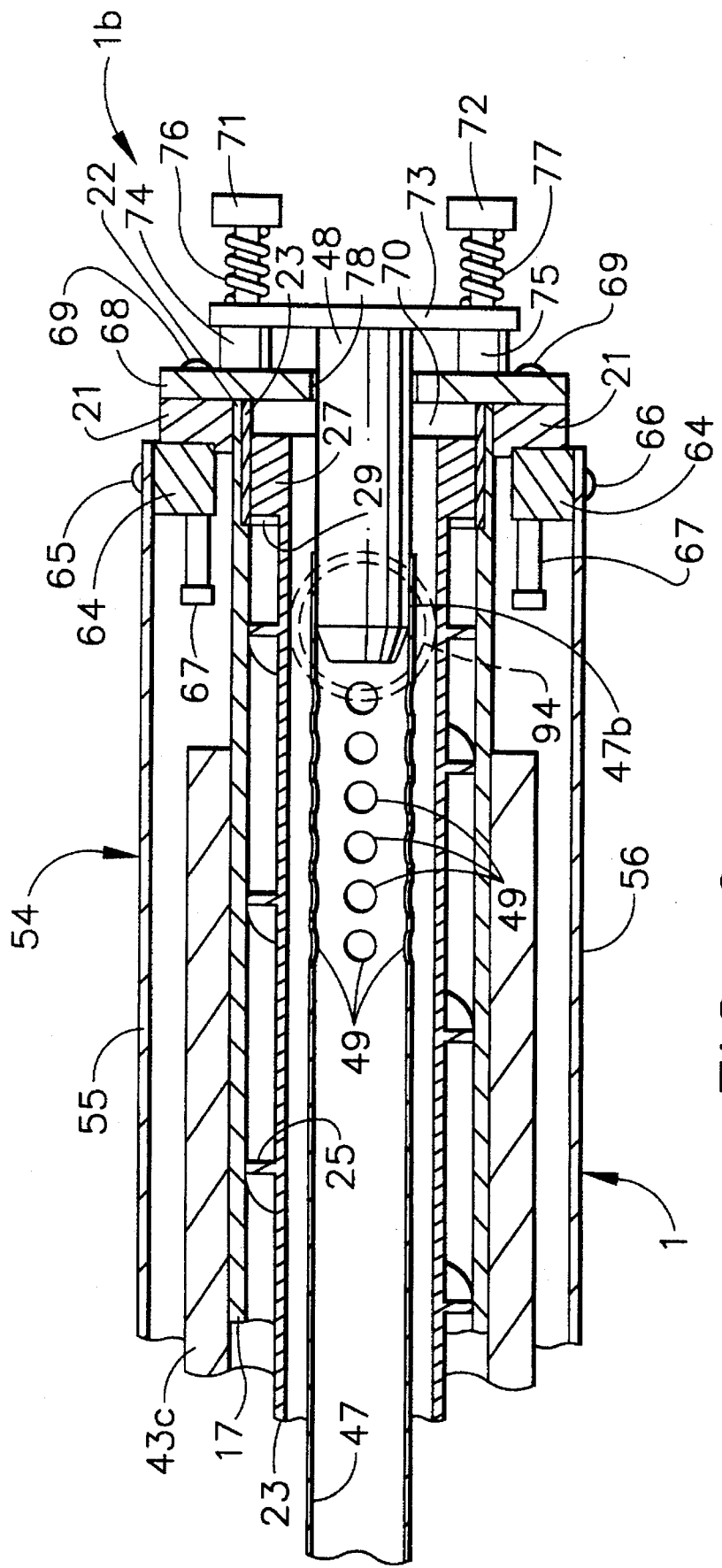
FIG. 6 is a fragmentary plan view, partly in cross-section of the forward end of the auger conveyor of FIG. 5.

The auger assembly, itself, is best shown in FIGS. 3, 4, 5 and 6. The auger assembly 1 has a rearward end 1a and a forward end 1b. FIG. 5 is a fragmentary, cross-sectional, plan view of the rearward end 1a of the auger assembly and FIG. 6 is a fragmentary, cross-sectional, plan view of the forward end 1b of auger assembly 1. The auger assembly 1 comprises an auger tube 17. As is most clearly shown in FIG. 5, the auger tube 17, at its rearward end, is provided with an auger base 18. Also adjacent its rearward end, the auger tube 17 is provided with an annular notch 19 adapted to receive a bronze bearing sleeve. As is most clearly shown in FIG. 6, the auger tube 17 has an annular flange 21 affixed to its exterior at its forward end 1b. Further at its forward end 1b the auger tube 17 has an annular interior notch 22 in which a bronze bearing sleeve 23 is located, the bronze bearing sleeve 23 being similar to the bronze bearing sleeve 20 at the auger assembly rearward end 1a.

Located within auger tube 17 there is a tubular auger 24. The auger flights 25 are machined on the exterior of auger 24 as are rear bearing journal 26 and forward bearing journal 27. It will be noted that bearing journals 26 and 27 cooperate with bronze sleeve bearings 20 and 23, respectively. The bearing surfaces are kept free of the polymer coated powder by annular plastic seals 28 and 29, respectively. As a result of this construction, the auger 24 is rotatable within auger tube 17. To accomplish rotation of auger 24, a gear box 30 is provided. The auger tube 18 is affixed to the gear box and the auger 24 has a drive gear 31 affixed to its rearward end and located within gear box 30. Drive gear 31 is meshed with a pinion gear 32, also located within gear box 30. Pinion gear 32 rides in a flange bushing 33.

Pinion gear 32 is non-rotatively affixed to a shaft 34 which is journaled in a bronze bushing 35 mounted in the gear box cover 36. The shaft 34 is pivotally attached to a shaft segment 37, as at 38. The shaft segment 37, in turn, is pivoted to the output shaft 39 of gear reducer 40, as at 41 (see FIG. 3). Gear reducer 40, in turn, is driven by prime mover 42, preferably an electric motor. From the above description it will be evident that actuation of motor 42 will result in rotation of auger 24 within auger tube 17.

Reference is now made to FIG. 4. It will be noted in FIG. 4 that the auger tube 17, through the majority of its length, is surrounded by ceramic band heaters 43, 43a, 43b and 43c. The purpose of heaters 43–43c is to apply heat to polymer coated particles being conveyed by auger 24, as will be more fully described hereinafter.

Turning again to FIG. 5, the rearward end of the auger assembly, behind gear box 30, is provided with a manifold 44. Manifold 44 has an inlet 44a to which an air heater 45 is affixed (see FIG. 4). A horizontal bore 46 intersects inlet 44a. An elongated tube 47 has its rearward end 47a inserted in manifold bore 46 with a slip fit.

Reference is now made to FIG. 6 wherein the forward end 47b of tube 47 is shown. The forward end 47b of tube 47 is closed by a plug 48 inserted in tube end 47b with a press fit. It will be further noted that the tube 47 near its forward end 47b is provided with a plurality of air return holes 49. The air return holes 49 lead from the interior of tube 47 to the annular space between the exterior surface of tube 47 and the interior surface of auger 23.

Returning to FIG. 5, it will be noted that drive gear 31, affixed to the rearward end of auger 24, is of an annular configuration, having a central bore 31a of a diameter substantially equal to the inner diameter of auger tube 24. It will further be noted that tube 47 extends through bore 31a in drive gear 31. The horizontal bore 46 in manifold 44, which connects with manifold inlet 44a, is enlarged as at 46a. The enlarged bore portion 46a communicates with manifold outlet 44b. Manifold outlet 44b, in turn, communicates with a vertically oriented muffler 50 (see also FIG. 4).

As is indicated diagrammatically in FIG. 4, the air heater 45 is connected by appropriate conduit means 52 to a source of compressed air 53. It would be within the scope of the invention to substitute an appropriate blower for the source of compressed air 53. It will be apparent from the above description that compressed air from source 53 will pass via conduit 52 to air heater 45. From air heater 45 the air will pass into the inlet 44a of manifold 44 and will enter air pipe 47. At the forward end of air pipe 47, the air will pass through air return holes 49 in air pipe 47, to the annular space between air pipe 47 and auger 24. The air will return along auger 24 through the bore 31a in drive gear 31, the enlarged bore portion 46a, the manifold outlet 44b and muffler 50 to atmosphere.

The auger tube 17 and the heaters 43–43c are provided with a cover structure generally indicated at 54. The cover structure 54 comprises sides 55 and 56 and a top 57. The top 57 is substantially planar and is provided along its longitudinal edges with downwardly depending flanges 57a and 57b. As is clearly shown in FIG. 2, flange 57b is attached to side 56 by appropriate fasteners 58 in the form of rivets or self-tapping screws. It will be understood that flange 57a of top 57 will be similarly attached to side 55 by similar fastening means 59. Sides 55 and 56 have flanges 55a and 56a, the purpose of which will be apparent hereinafter.

Referring to FIG. 5, the cover structure 54 has at its rearward end an inverted U-shaped frame member 60. Side 55 is attached to frame member 60 by a series of screws, one of which is shown at 61. Side 56 is similarly attached to frame member 60 by a series of screws 62 (see also FIG. 2). As is apparent from FIG. 5, frame member 60 accommodates elongated machine screws, two of which are shown at 63 is FIG. 5. These screws pass through frame member 60, auger tube base 18, auger gear box 30 and manifold 44 so that all of these elements are joined together.

Reference is now made to FIG. 6. It will be noted that the cover structure 54 is provided with an inverted U-shaped frame 64 similar to frame 60. The cover structure side 55 is attached to the frame 64 by a series of screws, one of which is shown at 65 in FIG. 6. Similarly, the side 56 is attached to frame member 64 by a series of screws, one of which is shown at 66 (see also FIG. 2). The frame 64 is provided with a plurality of elongated bolts (two of which are shown at 67) which pass with clearance through bores in frame 64 and are threadedly engaged in the annular flange 21 affixed to auger tube 17. An end plate 68 is affixed to flange 21 by a series of screws, two of which are shown at 69. The bolts 67, passing with clearance through frame 64 and threadedly engaged in flange 21, enable differential longitudinal thermal expansion between cover structure 54 and auger tube 17. The space 70 between auger 23 and end plate 68 will permit longitudinal thermal expansion of auger 23.

A pair of bolts 71 and 72 are threadedly engaged in end plate 68. The bolt 71 passes through a tube support plate 73 and a spacer 74 attached to the tube support plate. Similarly, bolt 72 passes through the tube support plate 73 and a spacer 75 attached thereto. The bolts 71 and 72 also pass through compression springs 76 and 77, respectively. Compression springs 76 and 77 abut against the heads of their respective bolts 71 and 72 and tube support plate 73. Finally, it will be noted that the metallic plug 48, closing the end of air tube 47 with a press fit, is attached to tube support plate 73. Thus the tube support plate 73 and plug 48 support the forward end of air tube 47. The plug 48 passes with a close sliding fit through a perforation 78 in end plate 68. This permits expansion of air tube 47 against the action of springs 76 and 77. Air tube 47, surrounded by hot air both inside and out, will tend to have greater longitudinal thermal expansion than the other elements. It will be seen, however, that this construction enables differential longitudinal thermal expansion of the cover structure 54, the auger tube 17, the auger 23 and the air tube 47.

Reference is now made to FIG. 4 and 5. The main base 11 of channel-shaped cross-section is surmounted by a short hinge base plate 79 which is welded to main base 11. Main base 11 is also surmounted by an elongated support base 80. The support base 80 extends to the forwardmost end of main base 11 but is not attached thereto. Hinge base plate 79 and support base 80 are pivotally joined together by a hinge 81 welded to both elements 79 and 80. The auger conveyor assembly is attached to support base 80 by means of machine screws 82 passing through the elongated perforations 55b in cover structure flange 55a and machine screws 83 passing through the elongated perforations 56b in flange 56 of the cover structure. As is clearly shown in FIG. 3, the motor 42 is attached to the gear reducer 40 which is provided with a base 40a. Gear reducer base 40a is attached to a mounting plate 40b affixed to main base 11, as shown. If the universal joint 38 connected to pinion gear shaft 34 is disconnected from shaft segment 37, the hinge 81 enables auger assembly 1 to be pivoted to a vertical position. This essentially removes auger assembly 1 from the working area of the compacting press, enabling it to be cleaned, serviced, repaired and the like. Operations can be continued with auger assembly 2, alone. Thus, while auger assembly 1 is out of service, the part making process will be slowed, but need not be discontinued.

It will be understood that auger assembly 2 is substantially identical to auger assembly 1, and like parts have been given like index numerals followed by "'" in FIG. 1.

Auger assemblies 1 and 2 are provided with means to introduce a supply of polymer coated powder thereto. The supply means may be identical to that set forth in U.S. Pat. No. 5,213,816 and is shown in fragmentary form in FIG. 2.

Near its rearward end, auger tube 17 of auger assembly 1 is provided with an opening 84 (see FIG. 1) adapted to receive the lower end of a vertical inlet or supply tube 85 (see FIG. 2).

A first hopper 87 is provided, into which the operator unloads a supply of polymer coated powder, as required. The first hopper 87 has an outlet 88 leading to a second hopper 89 which assures that a constant supply of polymer coated powder is present. The second hopper 89 is provided with an outlet 90 to which a flexible conduit or hose 91 is attached. The lower end of the flexible hose 91 is removably affixed to the upper end of vertical inlet tube 85 of auger assembly 1. The flexible hose 91 has a hand operated valve 92 located therein, by which the supply of polymer coated powder to the vertical inlet tube 85 can be started, stopped, and regulated. In a similar fashion, the second hopper 89 has a second outlet 93 to which a second flexible hose containing a valve (not shown) will be attached. This second hose will be removably connected to the upper end of an inlet tube 85' for the auger tube of auger assembly 2 and will function in the same manner.

It is important that the connection between the flexible hose 91 and the upper end of vertical inlet tube 85 be readily disconnectable. It would be possible, for example, to provide the upper end of vertical inlet tube 85 with a funnel-shaped member into which the lower end of flexible hose 91 loosely extends. The fact that hose 91 is readily disconnectable from vertical inlet tube 85, enables the auger assembly 1 to be pivoted to its inoperative position. It will be understood that the auger assembly 2 can be similarly disconnected from its flexible hose (not shown) and pivoted to an out-of-service position for purposes of cleaning, maintenance and repair.

At its forward end, the auger tube 17 of auger assembly 1 has a discharge opening formed therein. This opening is shown in broken lines in FIG. 6 at 94. A discharge tube 95 (see FIG. 2) is attached to auger tube 17 about the discharge opening 94 therein. The discharge tube 95 is configured to direct the heated polymer coated powder to the heated hopper 96 of the shuttle assembly 6. It will be understood that the auger assembly 2 will be provided with a similar discharge tube for the same purpose.

The shuttle assembly can be identical to that set forth in U.S. Pat. No. 5,213,816. The shuttle assembly is shiftable between a retracted position and an extended position. In its retracted position, powder from the heated shuttle hopper is discharged in measured amount into a heated powder ring (not shown) having a closed bottom. In the extended position, the hopper is closed to prevent further powder discharge therefrom, and the heated powder ring is located over the heated die 97 of the compacting press. The bottom of the powder ring is opened and the measured amount of polymer coated powder therein is discharged into the heated die cavity 97 of the compacting press.

Referring to FIGS. 1 and 2, the shifting of the movable part of shuttle assembly 6 is accomplished by means of a yoke 98 attached to the movable shuttle part. The yoke 98, in turn, is attached to the ball screw drive shaft 99 of a ball screw drive 100 powered by an electric motor 101. This mechanism rests upon a support 102 which is operatively attached to the tubular steel bracket 5.

The invention having been described in detail, its manner of operation can now be set forth. The overall delivery system, including the shuttle assembly 6, is intended to deliver the polymer coated powder to the die cavity of the compacting press, while raising the temperature of the polymer coated powder from ambient temperature to an operating temperature of from 280° F. to about 330° F. This is a temperature range just below the temperature where the powder starts to coagulate and become "tacky". The auger assemblies 1 and 2 are preferably run simultaneously to provide the desired throughput rate. The majority of the desired heating of the polymer coated powder is accomplished within the auger assemblies. Once again, a description of the operation of auger assembly 1 can be considered a description of the operation of auger assembly 2 as well.

It will be understood that a thorough heating of the polymer encapsulated powder is difficult to achieve because the polymer acts as an insulator. Furthermore, overheating can result in a "tackiness", coagulation, and finally the polymer coated powder becomes "cooked".

It will be remembered that the auger assembly 1 of the present invention is provided with ceramic band heaters 43–46 which apply heat to the auger tube 17. At the same time, heated compressed air is introduced into air tube 47 and is introduced into the annular cavity between air tube 47 and the interior of auger 24 at the discharge end of the assembly through perforations 49. This heated air passes through the annular space from the discharge end of the auger assembly toward the inlet end, and out to atmosphere through manifold 44 and muffler 50. This means that the auger 24 is heated by the hot air, the highest temperature of the auger being achieved near the discharge end of the auger assembly.

As the horizontal cylindrical column of polymer coated powder passes through the auger assembly by virtue of rotation of auger 24, heat is applied to both the inside and outside surfaces of the traveling powder column. This, in combination with the mixing action of the auger, provides powder to the shuttle assembly hopper 96 which is heated more uniformly than heretofore achievable, and at a more rapid rate. It will be understood that the auger assembly 2 operates in precisely the same way with precisely the same improved characteristics.

In an exemplary system built in accordance with the present invention, the augers had a 3 inch outer diameter and a 0.50 inch pitch. Each auger was constructed from an aluminum tube approximately 57 inches long with a 2 inch inner diameter. The flights were machined on the tube and were 0.375 inch high by 0.1 inch wide. The bearing journals were also machined at both ends of the auger. The auger tubes were relatively thin walled aluminum tubes, having a thickness of 0.25 inch and an inner diameter of about 3 inches.

The four ceramic band heaters about each of the auger tubes of each of the auger assemblies 1 and 2 had an inner diameter of 3.5 inches and a length of about 12 inches. Finally, the air tube 47 had an outer diameter of 1.25 inches.

The electric motors for the auger assemblies 1 and 2 each comprised a one horse power AC motor coupled to a 10:1 gear reducer. This combination drove the augers at a maximum speed of 150 RPM. The auger assemblies, working simultaneously, achieved a polymer coated powder flow rate of 20 pounds per minute, heating the polymer coated powder to a temperature of from about 280° F. to about 330° F.

This temperature of the polymer coated powder is maintained by the heated hopper 96 and the heated powder ring of the shuttle assembly. Once the heated and measured polymer coated powder was discharged in the heated die cavity of the compacting press, the temperature of the polymer coated powder was rapidly increased to the "set" point by the combination of the heated die cavity and the energy imparted during the compacting stroke.

The various heating elements of the structure may be controlled by thermocouples appropriately placed and providing feedback to the heaters. The compressed air, which is heated when the augers are running, may be unheated (or heated to a lesser degree) when the augers are stopped and may be used to cool the auger and the polymer coated powder therein to prevent overheating and melting thereof.

Modifications may be made in the invention without departing from the spirit of it. While the invention is shown and disclosed herein in what is believed to be the best mode, means other than hot air could be used to heat the auger including a hot liquid or an electrical heating element. Similarly, the auger tube could be heated by a flow of hot liquid or gas, rather than the above-noted heating elements. One of the primary features of the invention is to heat the horizontal column of polymer coated particles from both the inside and the outside as the particles thereof are being mixed and advanced by the auger flights.

What is claimed:

1. An auger conveyor assembly for heating and feeding polymer coated powder from a powder supply assembly to a shuttle assembly for delivery to the die cavity of a compacting press, said auger conveyor assembly comprising at least one auger conveyor having an elongated auger tube terminating in a rearward end with an inlet opening near said rearward end and terminating in a forward end with a discharge opening near said forward end, said discharge opening adapted to cooperate with said shuttle assembly, an inlet tube connected to said auger tube inlet and to said powder supply assembly, a hollow tubular auger having a length approximating that of said auger tube and being rotatably mounted in said auger tube, a prime mover operatively attached to said auger for rotation thereof, said auger having flight means on its exterior surface for advancing a tubular column of said polymer coated powder from said auger tube inlet to said auger tube outlet and to mix said polymer coated powder in said tubular column thereof, means to apply heat to said auger tube from without and means to apply heat to said auger from within, to more thoroughly and rapidly heat said polymer coated powder column therebetween from both the inside and the outside and to increase the throughput of said at least one auger conveyor, said means to apply heat to said auger from within comprising a manifold having an inlet and an outlet and to which said rearward end of said auger tube is operatively connected, a source of air, an air heater, said air source being connected to said air heater, said air heater being connected to said manifold inlet, an air tube, said manifold inlet being connected to the rearward end of said air tube, said air tube extending within and substantially the length of said auger with an annular space therebetween, said air tube having a closed forward end, said air tube having perforations therein adjacent said closed forward end, said annular space between said air tube and said auger being connected to said manifold outlet, a muffler connected to said manifold outlet, and means to move said air from said source through said air heater, said manifold inlet, said air tube, said air tube perforations, along said auger in said annular space between said air tube and said auger, said manifold outlet and said muffler to atmosphere, a cover structure for said auger conveyor, and means at the forward end of said auger conveyor to accommodate differential longitudinal thermal expansion of said cover structure said auger tube, said auger and said air tube.

2. The assembly claimed in claim 1 including a second auger conveyor identical to said at least one auger conveyor and comprising an auger tube with an inlet opening having an inlet tube connected to said inlet opening and said powder supply system, an outlet opening cooperating with said shuttle assembly, a tubular auger with exterior flights, a prime mover means for rotating said auger within said auger tube and means to apply heat to said auger tube from without and heat to said auger from within.

3. The assembly claimed in claim 1 wherein said auger tube, said auger and said tubular column of said polymer coated powder between said auger tube and said auger are substantially horizontally oriented.

4. The assembly claimed in claim 1 wherein said means to heat said auger tube from without comprises a series of ceramic band heaters extending thereabout and therealong.

5. The assembly claimed in claim 2 wherein in each of said at least one and said second auger conveyors said auger tube, said auger and said tubular column of said polymer coated powder between said auger tube and said auger are substantially horizontally oriented.

6. The assembly claimed in claim 2 wherein in each of said at least one and said second auger conveyors said means to heat said auger tube from without comprises a series of ceramic band heaters extending thereabout and therealong.

7. The assembly claimed in claim 2 wherein in said second auger conveyor said rearward end of said auger tube is operatively connected to a manifold having an inlet and an outlet, a source of air, an air heater, said air source being connected to said air heater, said air heater being connected to said manifold inlet, an air tube, said manifold inlet being connected to the rearward end of said air tube, said air tube extending within and substantially the length of said auger with an annular space therebetween, said air tube having a closed forward end, said air tube having perforations therein adjacent its closed forward end, said annular space between said air tube and said auger being connected to said manifold outlet, a muffler connected to said manifold outlet, and means to move said air from said source through said air heater, said manifold inlet, said air tube, said air tube perforations, along said auger in said annular space between said air tube and said auger, said manifold outlet and said muffler to atmosphere, whereby to heat said auger from within.

8. The assembly claimed in claim 7 including a cover structure for said second auger conveyor, and means at the forward end of said second auger conveyor to accommodate differential longitudinal thermal expansion of its respective cover structure, auger tube, auger and air tube.

9. The assembly claimed in claim 1 wherein said cover structure comprises a planar top and planar, downwardly depending sides, said cover structure having a forward end with an inverted U-shaped frame member attached within said forward end to said cover structure sides and top, a flange being attached to said forward end of said auger tube, a series of elongated bolts passing with clearance through holes in said U-shaped frame member of said cover structure and threadedly engaged in said auger tube flange to accommodate differential thermal expansion between said cover structure and said auger tube, an end plate being affixed to said auger tube flange by a series of screws, said auger having a forward end spaced from said end plate to accommodate differential longitudinal thermal expansion of said auger, a pair of bolts threadedly engaged in said end plate and extending forwardly thereof and terminating in bolt heads, an air tube support plate, spacer facing said end plate and being affixed to said air tube support plate, said bolts passing with clearance through said air tube support plate and said spacers, a pair of compression springs, said bolts also passing through said compression springs, said compression springs abutting said air tube support plate and said bolt heads, a plug being affixed to and extending rearwardly of said air tube support plate, said plug passing with clearance through a hole in said end plate and extending into, closing and supporting said forward end of said air tube, said plug passing through said end plate with clearance and being mounted on said air tube support plate accommodating differential longitudinal expansion of said air tube.

10. The assembly claimed in claim 8 wherein said cover structure of said second conveyor comprises a planar top and planar, downwardly depending sides, said cover structure of said second conveyor having a forward end with an inverted U-shaped frame member attached at said forward end thereof to said cover structure sides and top, a flange being attached to said forward end of said auger tube of said second conveyor, a series of elongated bolts passing with clearance through holes in said U-shaped frame member of said cover structure and threadedly engaged in said auger tube flange of said second conveyor to accommodate differential thermal expansion between said cover structure and said auger tube of said second conveyor, an end plate being affixed to said auger tube flange of said second conveyor by a series of screws, said second conveyor auger having a forward end spaced from said end plate to accommodate differential longitudinal thermal expansion of said second conveyor auger, a pair of bolts threadedly engaged in said end plate and extending forwardly thereof and terminating in bolt heads, an air tube support plate, spacers facing said end plate and being affixed to said air tube support plate, said bolts passing with clearance through said air tube support plate and said spacers, a pair of compression springs, said bolts also passing through said compression springs, said compression springs abutting said air tube support plate and said bolt heads, a plug being affixed to and extending rearwardly of said air tube support plate, said plug passing with clearance through a hole in said end plate and extending into, closing and supporting said forward end of said air tube of said second conveyor, said plug passing through said end plate with clearance and being mounted on said air tube support plate accommodating differential longitudinal expansion of said air tube of said second conveyor.

* * * * *

UNITED STATES PATENT AND TRADEMARK OFFICE
CERTIFICATE OF CORRECTION

PATENT NO. : 5,593,707
DATED : January 14, 1997
INVENTOR(S) : Bryan W. Goe and Robert C. Hertlein It is certified that error appears in the above-indentified patent and that said Letters Patent is hereby corrected as shown below:

Column 10, line 57 (claim 9), "spacer" should read --spacers--.

Signed and Sealed this

Sixth Day of May, 1997

Attest:

BRUCE LEHMAN

Attesting Officer  Commissioner of Patents and Trademarks